United States Patent [19]

Sander

[11] Patent Number: 4,474,719

[45] Date of Patent: Oct. 2, 1984

[54] PROCESS FOR MAKING HEAD PIECES WITH A MEMBRANE FOR PACKAGING CONTAINERS OF LAMINATE WITH A METALLIC BARRIER LAYER

[75] Inventor: Engelbert Sander, Vouvry/VS, Switzerland

[73] Assignee: Automation Industrielle SA, Vouvry, Switzerland

[21] Appl. No.: 287,169

[22] Filed: Jul. 27, 1981

Related U.S. Application Data

[62] Division of Ser. No. 79,565, Sep. 27, 1979, Pat. No. 4,317,420.

[30] Foreign Application Priority Data

Sep. 29, 1978 [DE] Fed. Rep. of Germany ...... 2842515

[51] Int. Cl.³ .................. B29C 3/00; B29C 11/00; B29C 17/03; B29C 17/08
[52] U.S. Cl. .................................. 264/155; 29/527.1; 264/250; 264/268; 264/DIG. 41
[58] Field of Search ............... 264/250, 267, 268, 138, 264/155, 156, 163, DIG. 41, 259; 29/527.1, 527.2, 527.4

[56] References Cited

U.S. PATENT DOCUMENTS

| | | | |
|---|---|---|---|
| 1,754,496 | 4/1930 | Barker | 264/DIG. 41 |
| 2,878,513 | 3/1959 | Slaughter | 264/DIG. 41 |
| 3,159,701 | 12/1964 | Herter | 264/267 |
| 3,256,378 | 6/1966 | Hauf | 264/267 |
| 3,313,875 | 4/1967 | Magerle | 264/267 |
| 3,629,385 | 12/1971 | Badavas et al. | 264/163 |
| 3,962,006 | 6/1976 | Saito et al. | 264/DIG. 41 |
| 3,988,413 | 10/1976 | Gaudet et al. | 264/DIG. 41 |
| 4,076,790 | 2/1978 | Lind | 264/268 |

FOREIGN PATENT DOCUMENTS 1339109  10/1961  France ................... 264/268

Primary Examiner—Willard E. Hoag
Attorney, Agent, or Firm—Paul J. Cook

[57] ABSTRACT

A process for making head pieces for containers with a membrane of laminate having a metallic barrier layer, is designed to make one-piece head pieces, of a thermoplastic material with a mouthpiece neck, a cone-like breast part next to it, a ring-shoulder next to the breast part, a ready-made round plate and a membrane of a laminate with a metallic barrier layer. From a tape of laminate with a metallic barrier layer, using a deep drawing operation, the round plate is produced in a form representative of the outline of the head piece to be produced, is stamped out and is then run down into a mold. At the same time as the lowering the membrane is stamped out of the center part and is kept in position. After this thermoplastic material is placed in the mold and then the membrane is lowered into its last position in the mold and at the same time as the lowering of the membrane pressing of the thermoplastic material in the mold takes place.

3 Claims, 8 Drawing Figures

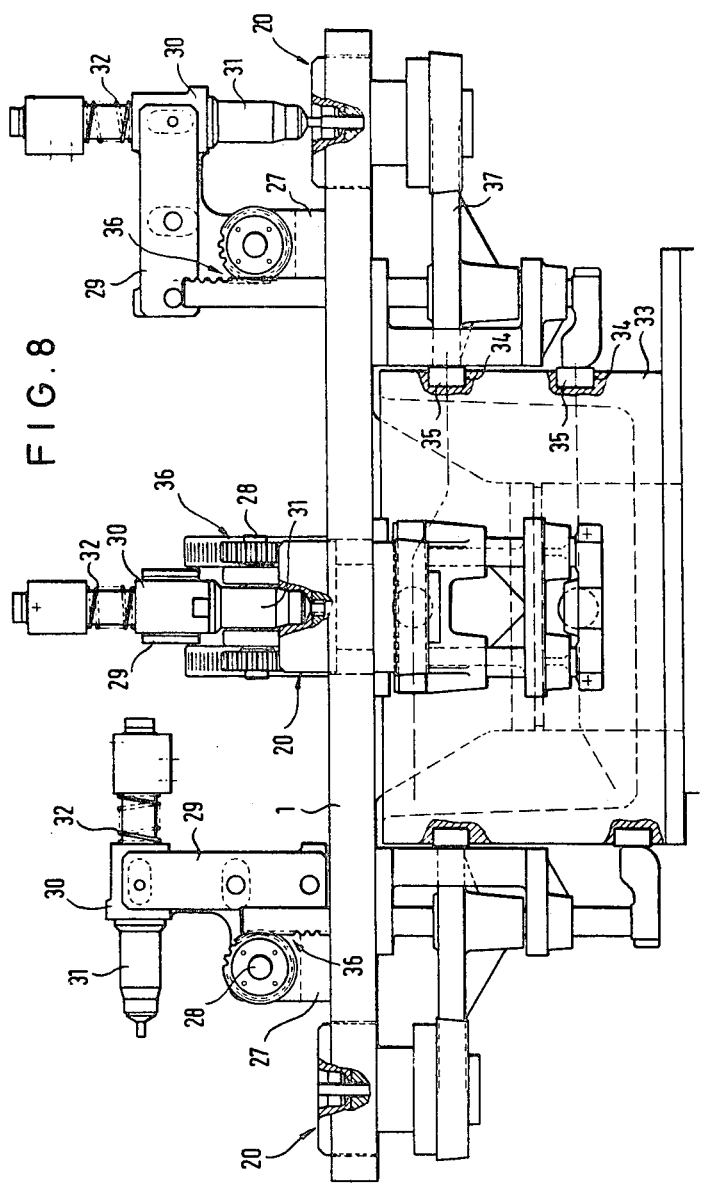

PROCESS FOR MAKING HEAD PIECES WITH A MEMBRANE FOR PACKAGING CONTAINERS OF LAMINATE WITH A METALLIC BARRIER LAYER

This is a division of application Ser. No. 079,565 filed Sept. 27, 1979 now U.S. Pat. No. 4,317,420.

BACKGROUND OF THE INVENTION

I. Field of the Invention

The present invention is with respect to a process for making head pieces for containers with a membrane of laminate having a metallic barrier layer, the head piece being made up of a thermoplastic material and being made in one piece, and the head piece has a mouth-piece neck, a cone-like breast part next to it, a ring-shoulder next to the breast part and a round plate and a membrane of a laminate with a metallic barrier layer, the round plate being made beforehand and then joined with the head piece. Such a process is given in the German Auslegeschrift specification No. 1,486,193.

II. The Prior Art

In the case of this earlier process an inner part, having a membrane, is placed in the head on the inner side or melted for joining with its plastics material. The head and the inner part are in each case made beforehand. Such inner parts with a barrier layer are used more specially in the case of collapsible tubes and have the purpose of making the laminate tubes, having a barrier layer, more impermeable to gas in the head part. This purpose has in fact to a great degree been effected by the invention of the German specification No. 1,486,193, but however, because the inner part is placed inside the head piece, between the tube structure and the inner part there is a space generally equal in size to the thickness of the head piece and which is without any barrier layer and for this reason—being made of plastics only—is permeable to gas.

Further it is necessary, in this past process, to have the inner wall face of the head piece of truly the same form as the inner part, because otherwise, on putting in position, there would be no completely fluid-tight connection, or the head piece would have to be melted to a greater degree, something which would made the process of making more complex and longer. Because of the separate process for making the head piece and then separately joining up with the inner part, the process is made generally complex. Furthermore, the membrane is at the lower end of the neck, something making for an unpleasing form of the structure seen on opening the tube, and because of the depth of the neck it is harder for the layer to be broken open when the tube is to be used.

In the German Offenlegungsschrift specification No. 2,628,014 details are given of a process for making a packaging tube, in which a separately made head piece of plastics has placed on it a connection body in the form of a many-layer round plate made up of a metal layer bedded in plastics layers is placed so as to be on the cone-like breast part and to some degree on the ring-shoulder, and the two parts are welded togerther by a high frequency field. In this respect, a nearly completely gas-tight join is produced between the tube body with a barrier layer and the round plate. In this respect however, as well, the head piece and the round plate are separately produced and then joined together, so that the shortcomings noted come into play in this case as well. Furthermore in this past design a gas-tight membrane may only be made in a separate working step, this making necessary separate apparatus.

In this connection there has been a suggestion (see "Modern Packaging", June 1978, pages 27–29) for using a three-layer inner part, made up of aluminum foil, in a stopper cap, the foil having on one side a wax layer and on the other side a plastics layer. The wax layer is placed facing the end of the cap. The cap is screwed on to the head piece and then so placed in a high frequency field that the plastics layer of the inner part is joined with the plastics of the head piece by melting or welding.

In the German Auslegeschrift specification No. 1,786,574, an account is given to a process for making a laminate container with a barrier layer within the laminate. In this process the container tube body is run into a two-piece head piece casting mold, into which a round plate with a barrier layer is so placed that on injection molding of the head, taking place as the next working step, using a thermoplastic material at least the face, turned towards the inside of the container, is joined with the thermoplastic material or covered with it. In this respect the mouth piece neck is shut off by the plastics. Such a closure is not gas-tight and a knife is needed for opening it, this limiting use because of danger of injury, specially in the case of children. Although the radial distance of the outer edge of the round plate from the edge, to be joined with the head piece, is to be small, there is at the shoulder still a part made of plastics which, for this reason, is not gas-tight.

The Swiss Pat. Nos. 354,577 and 431,923 give an account of a process and an apparatus for making tubes, in which a tube body of thermoplastic material is placed on a rod and run into a head female mold, into which, beforehand, a measured out amount of thermoplastic material has been placed for producing the head piece, and then pressed, that is to say the head piece is injection molded onto the tube body. The apparatus has a turning table with a number of working stations, a ready-made membrane being placed in one station on the outlet opening of the head piece. The tubes so produced are in no way gas-tight.

SHORT OVERVIEW OF THE INVENTION

One purpose of the invention is that of designing a process for making head pieces and in fact generally completely gas-tight tubes, which is simpler than past processes and in which a round plate and a membrane with a barrier layer is produced in one working step at the same time with the head pieces, the membrane being placed at the outlet end of the mouth piece neck, while the barrier layer in the breast and shoulder part of the head piece is so placed that there is a generally gas-tight connection between tube bodies of a barrier layer laminate and head pieces. The purpose of the invention is effected by the measures given in the characterising part of claim 1. Useful further developments of the invention and forms of apparatus more specially used for undertaking the process of the invention are given in the further claims.

An account will now be given of one apparatus, forming a working example of the invention, making use of the figures and making clear the useful effects of the invention.

FIG. 8 is a view of a turning table with pressing parts and female molds in different positions.

DETAILED ACCOUNT OF WORKING EXAMPLE OF THE INVENTION

Figure 1:
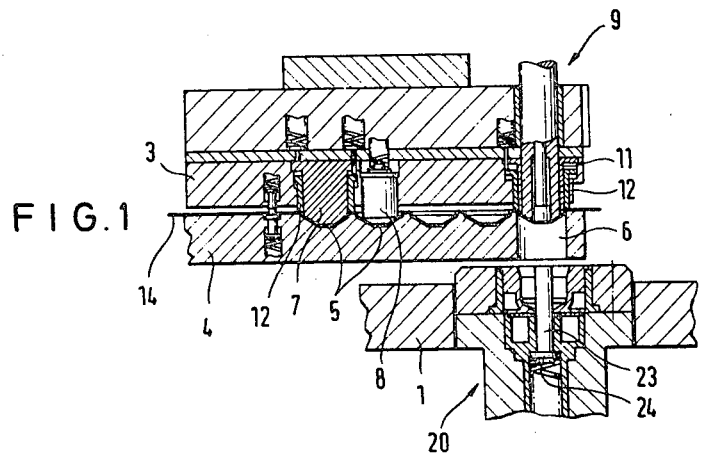
FIG. 1 is a view of a stamping tool, placed over a head female mold placed in a turning table, at the time of a molding operation.
Figures 2, 3:
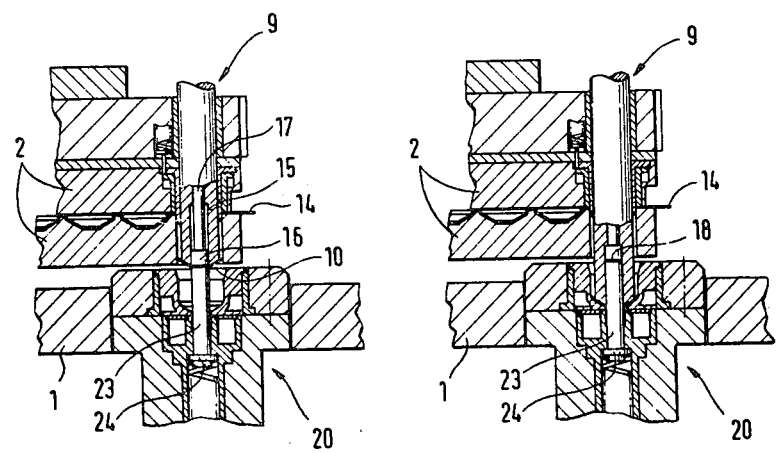
FIG. 2 is a view of the same parts as in FIG. 1, a round plate with a membrane now having been separated.
FIG. 3 is a view of the same parts as in FIGS. 1 and 2, the round plate now having been lowered into an end position and the membrane having been stamped out.

The apparatus of the invention is made up of a turning table 1 over which there is a stamping tool 2 (FIGS. 1-3), made up of a top block 3 and a lower block 4. Lower block 4 has deep drawing molds 5 and through hole 6. It would however be possible for deep drawing molds 5 to be designed so as to be able to be changed over for other, different molds, in lower block 4. The top edge of the through hole 6 is a cutting edge. Top block 3 has within it deep drawing stamp 7, an axially moving positioning nosepiece 8, acted upon by a spring, and a lowering and stamping punch 9. Deep drawing stamp 7 and positioning nosepiece 8 and deep drawing molds 5 are worked together, while the lowering and stamping punch 9 is lined up with the through hole 6. Lowering and stamping punch 9 may have an edge cutting out a round plate 10 against the edge of the through hole, although, as is to be seen in the workkng example, it may have a separate cutting pipe 11 for undertaking the cutting/operation. This cutting pipe 11 is fixedly placed in the top block 3.

Not only the deep drawing stamp 7 but furthermore the lowering and stamping punch 9 with the cutting pipe 11 are placed within spring grippers 12, that is to say grippers able to be pushed out against the effect of springs. Top and lower blocks 3 and 4 have guides so as to be able to be moved towards each other. Between the top and lower blocks a tape or ribbon 14 of a laminate with metallic barrier layer is moved in steps and using guides, not to be seen in the figure. Near the deep drawing molds 5 there is at least one spring lifter 13, pushing up (when the stamping tool 2 is open) the laminate tape 14 out of the deep drawing mold 5 for stopping any damage to it on further transport.

The lowering and stamping punch 9 has a center hole 15 (see FIG. 2), in which a piston 16, having a piston rod 17, is movingly placed. The outer edge of the center hole is in the form of a cutting edge, that is to say the size of the cross-section of the hole 15 is the same as that of the membrane 18 to be stamped out (see FIG. 3). The end face of the lowering and stamping punch 9 is in line with the form of the round plate 10.

Figure 4:
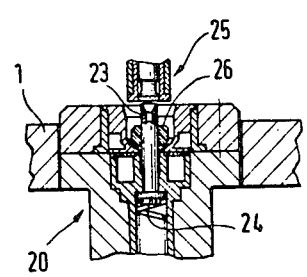
FIG. 4 is a view of a positioning unit for thermoplastic material, placed over a head female mold.
Figure 5:
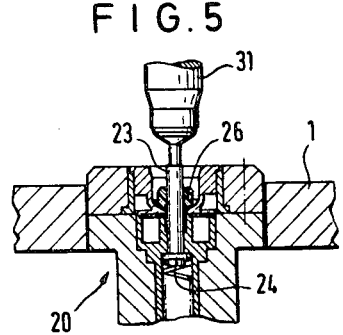
FIG. 5 is a view of a pressing part, placed over a head female mold, in a starting position before pressing.
Figure 7:
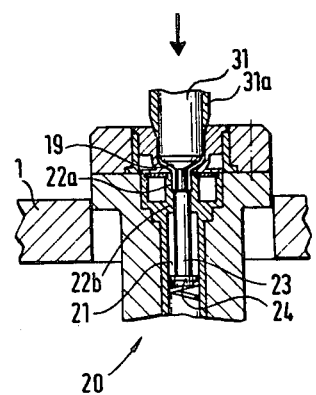
FIG. 7 is a view of the same system as in FIG. 6, the pressing part now having been moved out into the pressing position as well.

In the turning table 1 (see FIGS. 1 and 8) head female molds 20 are placed so as to be able to be moved axially. These molds 20 are representative of the outer form of a head piece 19 to be made (see FIG. 7). For making them easier to be produced, the molds 20 may be made in a number of parts (as made clear in the figures) and if need be they may have holes for running cooling material through them. In line with the center axis of the head female mold 20 there is a hole 21, which has an opening 22 (axially in line with it) opening into the space inside the head female mold 20 with a smaller diameter. The top part 22a of the opening 22 is responsible for forming the outer face (that is to say with a screw thread) of the head piece to be produced, while the lower part 22b, having a smooth inner face, takes the form of a guide for a pusher 23 fixed on a piston 24 running in the hole 21. Over the turning table 1 there is unit 25 (Only marked as a mouth-piece in FIG. 4) for placing thermoplastic material 26 (see FIG. 4) into the head female molds 20.

The head female molds 20 are spaced evenly round, and with an equal distance from, the axis of turning of the turning table 1. Between the axis of turning and each head female mold 20 there is one of a number of supports 27 (see FIG. 8), the supports 27 being as well placed in a circle. In each support 27 a horizontal turnpin 28 is bearinged for supporting an angled arm 29, which is able to be turned through 90°. Generally speaking it is furthermore possible for the angled arms 29 to be designed for turning about a vertical axis. The turning of the arms is necessary for fully uncovering the head female molds, for example on placing in position the round plate and the membrane, and on putting in the thermoplastic material.

Figure 6:
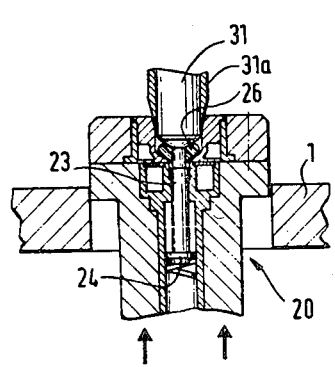
FIG. 6 is a view of the same parts as in FIG. 5, the head female mold having been moved out into the pressing position.

In the free end of the arm 29 there is a support and guide pipe or bush 30, in which a pressing punch or part 31 (see FIGS. 5-8) is placed so as to be able to be moved. The pressing part 31 has one end representative of the inner form of the head piece 19 to be produced. The pressing part 31 may furthermore have round it a cylindrical pipe 31a (to be seen diagramatically in FIGS. 6 and 7) joined with the support and guide pipe 30. The pressing part is able to be moved within pipe 31a. The end face of the pipe 31a is responsible for limiting the lower edge of the head piece 19 to be produced. The pressing part 31 is forced by a spring 32 into an end position.

Because the arm 29 may be turned about the horizontal turnpin 28 the pressing part 31 is horizontal in one end position, this making it possible for it to be used in a simple way with parts of the system placed at the outer edge of the turning table, so that it is for example readily possible to put a cap into position or a tube body, made beforehand, may be pushed on.

Under the turning table 1, in the middle, there is an unmoving drum 33 with camways 34 in which nosepieces 35 are run, the nosepieces being joined up with parts of the apparatus at the separate working stations for mechanical operation. An example for the mechanical system for driving the turning angle arms 29 is to be seen in FIG. 8 making use of a gear and rack unit 36 and for the vertical motion of the head female molds 20 using connection parts 37. Further units in connection with tube making may as well be controlled using nosepieces and camways in the drum, such control and, at least in part, driving taking place when the turning table 1 is moved on from one position to the next one. This is of good effect because only one driving system, that is to say the driving system of the turning table is necessary, this putting an end to any troubles with motion of the different control systems getting out of step, and furthermore, with such a design, the apparatus is made generally smaller, safer and more readily to be seen in all its parts. A further outcome of the design is that it is simpler to keep an eye on the functioning of the system.

ACCOUNT OF OPERATION OF THE APPARATUS OF THE INVENTION UNDERTAKING THE PROCESS

A laminate tape 14 with a metallic barrier layer is run between the top and lower blocks 3 and 4 into the stamping tool 2. The material of the laminate tape may be the same as that used for the bodies of the tubes, but however it may be of an other material or have a different thickness.

Using a driving system (not figured) the tape is moved in steps through the stamping tool. The single steps are the same in size as the distance between the processing stations. On the top and lower blocks 3 and 4 being moved in relation towards each other firstly the spring grippers 12 and furthermore the positioning nosepiece 8 come up against the laminate tape, forcing it strongly against the lower block 4 and into a deep drawing mold 5. On further motion, a round plate with a membrane is formed by the deep drawing stamp 7 in the deep drawing mold. The apparatus is best so worked that the limiting lines of the round plate and of the membrane and, as far as is necessary, other grooves (for example to make it easier for a hole to be made in the membrane) are force-formed or embossed at the same time. If no membrane is desired it may be completely punched out.

On molding each new round plate at the same time a round plate, force-formed some steps earlier, is separated by the lowering and stamping punch 9, or the stamping pipe 11 placed round it from the laminate tape and moved by way of the through hole 6 towards a head female mold 20 (FIG. 2) lined up with the same axis. When this is done the pusher 23 of the head female mold is moved out as far as it will go. On the downward motion of the round plate 10 (see FIG. 2) its membrane part comes up against the pusher 23. Because the last-named is stopped, the piston 16 in the lowering and stamping punch 9 is moved in on the further downward motion of the stamping punch 9. For this reason the cutting edge of the center hole 15 has the effect of cutting out the membrane 18 (FIG. 3) in the last part of the motion of the lowering and stamping punch 9 (FIG. 3) the round plate 10 is placed in the lower part of the head female mold, which then goes back into its starting position.

To make certain of a center position of the membrane 18 on the pusher 23, on lifting the piston 16, the piston may have vacuum ways (not figured) ending at its end face joined with a vacuum pump, or it may have sticking faces for producing a sticking connection with the piston, the connection being broken when no longer needed. The vacuum ways or sticking faces are more specicially placed near the edge of the piston. If no membrane is to be present the piston 16 may have vacuum ways joined with a vacuum pump which may be turned off. In this case on backward motion of the lowering and stamping punch 9 the membrane is moved along as well and, on further motion of the turning table, pushed out.

On relative motion between the upper block 3 and the lower block 4 away from each other there is firstly the backward motion of the deep drawing punch 7 and of the lowering and stamping punch 9. Then the grippers 12 are freed so that it is only the spring position nosepiece 8, whose form is the same as that of the deep drawing punch, which has the effect of forcing the round plate, formed in the last step, into a deep drawing mold 5 so that, for this reason, the complete laminate tape is centered. In the end position of the relative motion the tape 14, lifted out by the lifter 13 is free and it is moved one by one step, the step being equal in amount to the center-to-center space of the deep drawing molds 5 placed in a row, and the operation takes place again.

After the lowering and stamping punch 9 has been completely cleared of the head female mold 20, the turning table 1 is turned through one step and the head female mold 20 gets a piece of thermoplastic composition from the unit 25 (FIG. 4), after which the turning table is moved through one further step.

On coming into the new position the angled arm 29 next to the head female mold 20 and supporting the pressing punch or part 31 is turned till it is in line with the head female mold 20. In this case the male part, forming the outlet opening of the head piece 19, of the pressing part 31 is parallel to and on one end face or is a small distance short of the membrane 18.

On further motion of the turning table, the head female mold is moved towards the pressing part 31 from the turning table (FIG. 6) to such a degree that the pressing part 31 is somewhat pushed into the positioning and guide pipe 30 (FIG. 6), this pushing together the spring 32. As soon as the desired end position has been go to, or shortly before this, the moved out head female mold 20 with the pressing part 31 comes into the pressing station, the head female mold 20 being so supported by a lifting force and the pressing force acting downwards on to the pressing part 31 that the pressing force is kept within a limited system and does not have any effect on the turning table. On producing the pressing force there is a motion of the pressing part 31 into the head female mold 20, the spring 32 coming up into position in the starting position and, for this reason, positioning the pressing part 31 at a point in line with the last head piece mold.

The pressure is kept up long enough for the head piece to become hard. On further motion of the head female mold 20 it is possible to have, as needed, one or more cooling stations. On the further way (moved by the head female mold 20) the threaded part is unscrewed from the head female mold 20 of the head piece 19 in one station and then the angled arm with the completed head piece is turned backwards so that the pressing part is horizontal. In a further station it is then possible for the head piece to be placed in a box by pushing off from the pressing part 31, by a pushing out part or by blowing with compressed air. If there is a cylindrical pipe 31a round the pressing part 31, the pressing part 31, representative of the inner form of the head piece 19 formed, may be pulled in and, because the head piece 19 is supported on the end face of pipe 31a, it may be violently cleared from the moving back pressing part 31. In this respect it is furthermore clear from the pipe 31a or, if necessary, a further stripper may be used.

It is however furthermore possible for the head piece firstly to be kept on the pressing part and using a unit placed at the outer edge of the turning table tube bodies made up of a laminate with a metallic barrier layer, may be pushed over the head pieces. In a later station it is then possible for a welding unit, for example high frequency or UV welding unit to be placed, for welding the head piece to the tube body. As may be needed cooling stations and a pushing out station will be present.

Using the process and apparatus of the invention it becomes possible for head pieces with an outer round plate of laminate with a metallic barrier layer with or without a membrane to be produced in a single apparatus and for this reason as well it is possible for complete tubes with the desired gas-tight properties to be produced, because the outer round plate of the head piece may be joined to the tube bodies in a generally speaking 100% gas-tight way.

I claim:

1. A process for making head pieces for containers with a membrane of laminate having a metallic barrier layer, the head piece being made up of a thermoplastic material and being made in one piece, and the head piece has a mouth-piece neck, a cone-like breast part next to it, a ring-shoulder next to the breast part and a round plate and a membrane of a laminate with a metallic barrier layer, the round plate being made beforehand and then joined with the head piece, characterised in that from a tape of laminate with a metallic barrier layer, using a deep drawing operation, the round plate is produced in a form representative of the outline of the head piece to be produced, is stamped out and is then lowered into a female mold, and at the same time as the lowering the membane is stamped out of the center part and is kept in position, and after this thermoplastic material is placed in the female mold and then the membrane is lowered into its last position in the mold and at the same time as the lowering of the membrane pressing of the thermoplastic material in the female mold takes place.

2. A process as claimed in claim 1 characterised in that the round plate, made by deep drawing of the laminate tape, is moved on with the laminate tape and positioned and only stamped out at a position over the mold.

3. A process as claimed in claim 1 or claim 2 characterised in that on deep drawing force-formed or embossed lines for the membrane and/or in the membrane are produced.

* * * * *